US007716232B2

(12) United States Patent
Glenn

(10) Patent No.: US 7,716,232 B2
(45) Date of Patent: May 11, 2010

(54) DEVICES, SYSTEMS, AND METHODS FOR PRODUCING AND DISTRIBUTING MULTIPLE VARIATIONS OF AN INSTANCE OF A MEDIA PRESENTATION

(75) Inventor: Christopher J. Glenn, Edina, MN (US)

(73) Assignee: Flagpath Venture VII, LLC., Edina, MN (US)

(*) Notice: Subject to any disclaimer, the term of this patent is extended or adjusted under 35 U.S.C. 154(b) by 528 days.

(21) Appl. No.: 11/402,153

(22) Filed: Apr. 10, 2006

(65) Prior Publication Data
US 2007/0239883 A1 Oct. 11, 2007

(51) Int. Cl.
G06F 17/30 (2006.01)
(52) U.S. Cl. ........................... 707/758; 707/913
(58) Field of Classification Search ............... 707/1
See application file for complete search history.

(56) References Cited

U.S. PATENT DOCUMENTS

| | | | |
|---|---|---|---|
| 5,559,549 A | | 9/1996 | Hendricks et al. |
| 5,659,793 A * | | 8/1997 | Escobar et al. ............. 715/202 |
| 5,748,187 A * | | 5/1998 | Kim et al. .................. 715/201 |
| 5,930,804 A * | | 7/1999 | Yu et al. ................... 707/104.1 |
| 6,081,262 A * | | 6/2000 | Gill et al. .................... 715/202 |
| 6,317,141 B1 * | | 11/2001 | Pavley et al. ................ 715/732 |
| 6,415,326 B1 * | | 7/2002 | Gupta et al. ................ 709/231 |
| 6,424,793 B1 * | | 7/2002 | Setogawa et al. ............ 386/95 |
| 6,464,140 B1 * | | 10/2002 | Weigel .................. 235/462.07 |
| 6,601,103 B1 | | 7/2003 | Goldschmidt et al. |
| 6,721,955 B2 | | 4/2004 | Khoo et al. |
| 6,738,078 B1 * | | 5/2004 | Duncombe ................. 715/761 |
| 6,760,916 B2 | | 7/2004 | Holtz et al. |
| 6,826,593 B1 * | | 11/2004 | Acharya et al. ............. 709/203 |
| 6,986,153 B1 | | 1/2006 | Ridderheim et al. |
| 2001/0013123 A1 | | 8/2001 | Freeman et al. |
| 2001/0020242 A1 * | | 9/2001 | Gupta et al. ............... 707/501.1 |
| 2001/0039657 A1 | | 11/2001 | Fopeano et al. |
| 2002/0010863 A1 * | | 1/2002 | Mankefors .................. 713/189 |
| 2002/0019978 A1 | | 2/2002 | Terretta |
| 2002/0120929 A1 | | 8/2002 | Schwalb et al. |
| 2002/0129089 A1 * | | 9/2002 | Hegde et al. ................ 709/200 |
| 2002/0144268 A1 | | 10/2002 | Khoo et al. |
| 2002/0156842 A1 | | 10/2002 | Signes et al. |
| 2002/0194607 A1 | | 12/2002 | Connelly |
| 2002/0199189 A1 | | 12/2002 | Prijatel et al. |
| 2003/0037068 A1 * | | 2/2003 | Thomas et al. ............. 707/200 |

(Continued)

Primary Examiner—James Trujillo
Assistant Examiner—William Spieler
(74) Attorney, Agent, or Firm—Brooks, Cameron & Huebsch, PLLC

(57) ABSTRACT

Devices, systems, and methods are described for authoring, producing, securing, and/or distributing multiple variations of an instance of a media presentation. For example, one device embodiment includes a processor and memory having instructions executable on the processor. The instructions can allow a producer of media content to define a number of variating dimensions for a media presentation, maintain subscriber variation database tables having records that define subscriber variations in terms of a set of variating dimensions from the number of variating dimensions, maintain media element database tables having records that define media elements in terms of a set of variating dimensions from the number of variating dimensions, and determine which elements and in what order the elements are to be included a variation of an instance of a media presentation.

27 Claims, 5 Drawing Sheets

U.S. PATENT DOCUMENTS

| | | |
|---|---|---|
| 2003/0067554 A1 | 4/2003 | Klarfeld et al. |
| 2003/0185546 A1* | 10/2003 | Hirota .......................... 386/83 |
| 2003/0229895 A1 | 12/2003 | Jasinschi et al. |
| 2004/0015986 A1 | 1/2004 | Carver et al. |
| 2004/0025180 A1 | 2/2004 | Begeja et al. |
| 2004/0073925 A1 | 4/2004 | Kinoshita |
| 2004/0163101 A1 | 8/2004 | Swix et al. |
| 2004/0168190 A1 | 8/2004 | Saari et al. |
| 2004/0189696 A1* | 9/2004 | Shirriff ....................... 345/738 |
| 2004/0237120 A1* | 11/2004 | Lewin et al. ................. 725/135 |
| 2005/0071863 A1 | 3/2005 | Matz et al. |
| 2005/0108741 A1* | 5/2005 | Cookson et al. ............. 720/659 |
| 2005/0132398 A1 | 6/2005 | Baran et al. |
| 2005/0189121 A1 | 8/2005 | Kim et al. |
| 2007/0132780 A1* | 6/2007 | Garbow et al. .............. 345/619 |

\* cited by examiner

501 Particle Serial Number
502 Logical condition associated with media particle
503 Textual representation of media particle
504 Presentation Preview Filters

DEVICES, SYSTEMS, AND METHODS FOR PRODUCING AND DISTRIBUTING MULTIPLE VARIATIONS OF AN INSTANCE OF A MEDIA PRESENTATION

FIELD OF THE DISCLOSURE

Embodiments of the disclosure may be used to create multiple variations of a media presentation. The disclosure includes, for example, devices, systems, and methods for creating multiple variations of an instance of a media presentation based on a producer's anticipated audience diversity. Some embodiments can also include a method for encrypting each variation, if desired, such that it can be presented on one and only one presentation device.

BACKGROUND

In the media production world of audio (e.g., radio, audio CD, streaming IP audio, and podcasts) and video (cable, television, DVD, streaming video, and podcasts), content developers presently need to write a script, record audio and/or video content based on that script, and then manually edit the content into some form of output (e.g., a movie, a radio program or a multimedia presentation.) This creative process is inherently a one-to-many approach in that there is a single output for an entire audience. That is, the television program that you see is the same one your neighbors see.

Attempts have been made to customize the media experience by allowing the preferences of individual users to drive the presentation of repurposed media segments. The term "repurposing" is used in the media industry to refer to when media originally produced for one purpose (e.g., television broadcasting) is re-used in a mostly unmodified form for a different purpose (e.g., web streaming). The term "segment" is generally used in the media industry to refer to a standalone unit of audio or video, such as a news story, a sports highlight segment, or a commercial. In many instances, content is made up entirely of linear segments assembled by the program's producers prior to, or concurrent with, transmission to the end-user. Approaches that rely on repurposed content create experiences that lack integral continuity and, therefore, provide no mechanism for media producers to control, predict, or manage the variations of content that the audience experiences.

One approach of this type has been to collect repurposable segments, for example, from a wide variety of unrelated production sources and categorize the segments. Then, when an end user contacts a cataloging service, the system can prepare a list of segments that would likely be of interest to that end user. The end user could then review the segment list, make changes or decisions about what segments in the list were of interest and then watch those repurposed segments. In such systems, the end user ultimately has control over which individual segments are consumed and in what order they are consumed in.

One challenge to this approach is that the repurposed segments lack end-to-end continuity. In other words, these sequential segments do not make up a coherent media program that was professionally produced. The included segments may come from many different media programs and the producers of those programs did not intend for the segments to be viewed out of context. If one watches the evening news or any professionally produced media program, the order of the segments is carefully chosen by the program's producers. As such, systems for customized media that categorize repurposed content violate this important aspect of media production. Such systems are similar to surfing the Internet in that a user goes from interest to interest, from content provider to content provider, consuming various snippets of information along the way and stopping whenever the user so chooses. Thus, in effect, these approaches are analogous to a list of web sites being created for each end user based on their interests.

Another challenge is that such systems do not account for telecommunication network costs or capacity, which may be especially important as personal media become wireless. Telecommunications networks (e.g., cellular data networks) are typically much more expensive to operate during peak times. As such, a system whereby people review a personal media list and then download the content on-demand would likely lead to many people using the network during a prime time period. This is impractical for wireless communications and many forms of wired communications. For these reasons, approaches that allow end users to interact with a customized media list may be less practical from a commercial perspective.

In addition, such systems typically do not support the advertising model of most media, where the commercial insertions are forced upon an audience at a very specific (usually the most dramatic) point during a program. Furthermore, trends indicate a shifting away from 30-second commercials toward more product placements within the media program itself and such systems cannot practically support this trend. If a user is allowed to choose what component segments are ultimately consumed, then the user likely will choose to bypass the commercial announcements.

Another approach streams segments of content to an end user, whereby a decision about what segment to send next is only determined by the system while the previous segment is streaming. In these approaches, the system is using feedback from the end user terminal to determine what comes next. If a viewer watched an entire segment about boating, maybe the next segment will also be about boating; whereas if the boating segment was skipped, maybe the next segment will be skiing. Such systems require significant amounts of processing power and communications bandwidth at both the broadcaster's end and the end user's terminal. This approach too does not give media producers the control to create a commercially viable product.

Yet another approach sends multiple audio/video streams to a user's terminal and then includes in-band text, tags or placeholders to switch the stream presented to the end user based on either user demographics or other user input or preferences. This approach again suffers from the "bandwidth cost" issue. In such systems, multiple full streams are sent simultaneously to the subscriber terminal, meaning that prime-time bandwidth can be even more strained than in the systems discussed above.

In addition, because of the bandwidth issue, it becomes impractical to present more than a few possible variations of experience to the viewing audience because each possible segment of content has to be streamed to the user terminal so that discrimination can take place by the end user or the end user's terminal. This approach would allow broadcasters to send two or three commercials concurrently during a 30-second commercial break, and would allow different terminals to display different commercials, but this approach can be impractical for other types of non-commercial segments because typically only commercials are produced in a fixed length (i.e., one can stream multiple commercials concurrently because they are all 30-seconds.) Few other types of media segments share this characteristic.

In all of the above approaches, the component segments are not customized to the end user. For example, if two different users are both interested in NFL highlights, both users will receive the identical football highlights, or at a minimum, highlights from only those teams that interest them. That is because the above approaches take traditional media segments and discriminate which segments will be received by which end users. They do this based on a database of end user preferences. That is, if a user likes Green Bay Packer highlights, then the user gets Green Bay Packer highlights, if the user wants a specific area's weather forecast, then they will get a specific area's weather forecast. However, these approaches do not take advantage of the way that media is typically produced.

Because all of these existing methods for customized media rely on user preferences as the key input to the process, the users drive the reception process and the choice of segments as opposed to the producers driving the production process in their production of segments. One reason user preference driven media customization may be inappropriate is that mass media is based on the foresight of media producers to give audiences content that they do not know they want. It is the ability of a producer to take an audience involuntarily down a path that allows suspense, drama or comedy structures to work.

DETAILED DESCRIPTION

Figure 1:
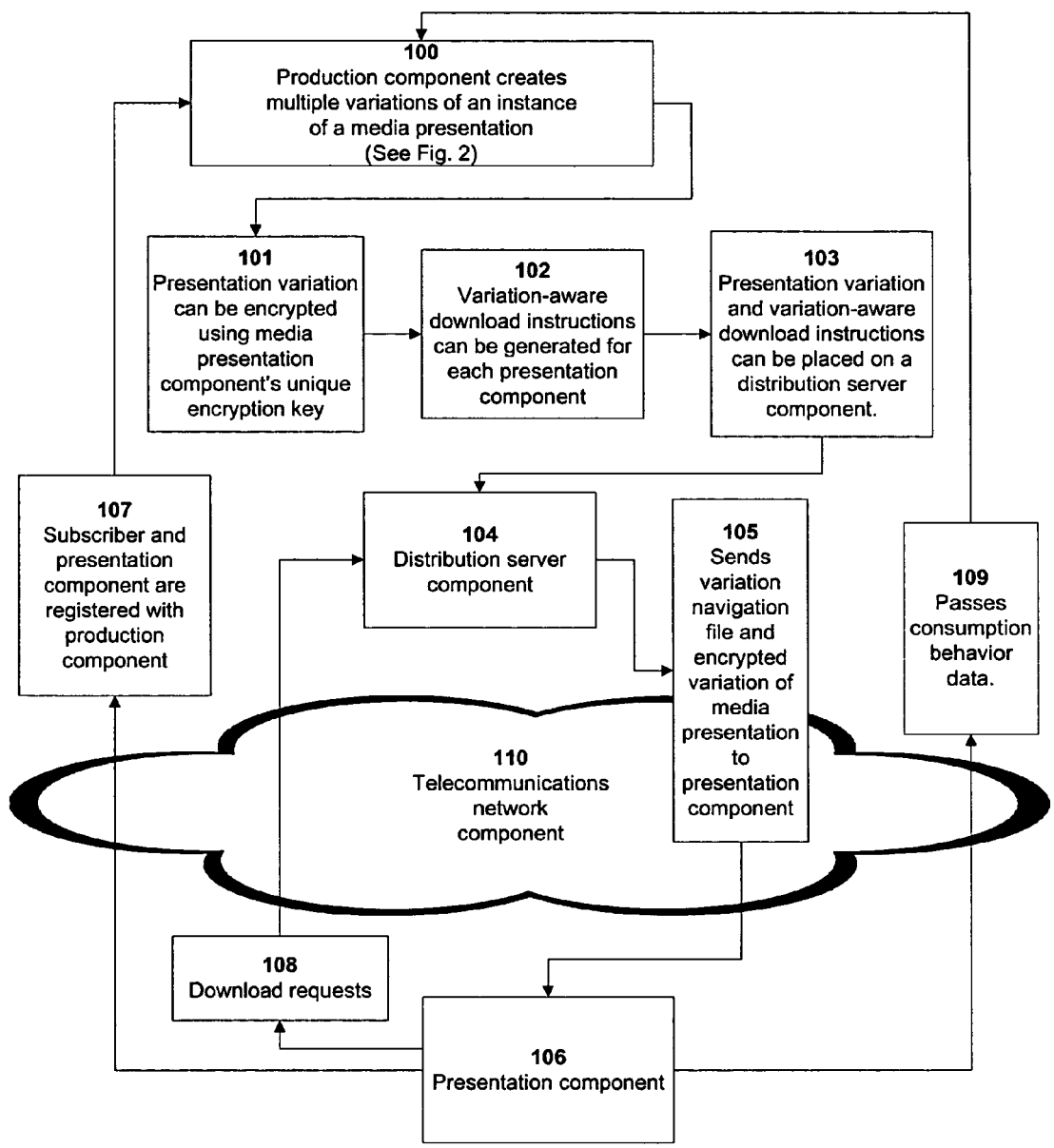
FIG. 1 shows a block diagram of a variation-aware system to produce multiple variations of episodes of podcasts.

In the following detailed description of the present embodiments, reference is made to the accompanying drawings that form a part hereof, and in which is shown by way of illustration how such embodiments may be practiced. These embodiments are described in sufficient detail to enable those skilled in the art to practice the embodiments and it is to be understood that other embodiments may be utilized and that process, electrical, or mechanical changes may be made without departing from the scope of the present disclosure. The term "a" should be construed herein to mean "one or more" unless a component is explicitly stated as singular or unless multiple components would be impractical.

Embodiments of the disclosure may be used to create multiple variations of an instance of a media presentation. An instance of a media presentation can refer to, for example, an episode of a television program, an episode of a radio broadcast, an episode of a "podcast", an edition of a newsletter, or a presentation of a web page at a specific point in time. "Podcasting" is a term that is used herein to describe the process of placing audio and video content onto a media presentation device through an Internet connection.

To achieve such variations, media production systems, devices, and methods can be used to drive how the audience is defined; how the producers and writers script the media elements during the pre-production stage; how the technicians shoot, record, pre-edit, and prepare the media elements during the production stage; and/or how the variations of the instances of the media presentation are created in the post-production stage, among other features.

Embodiments disclosed herein can provide significant value because, for example, traditional media production systems and methods only produce one instance of a media presentation for the entirety of an audience. Such limitations force program producers to target, for example, the lowest common denominator of an audience, which often means that consumption of media content is not optimally efficient or effective for a significant portion of that audience.

This can be especially true in corporate communications, where the cost of internal communications and training is a major concern and, in many cases, where the audience members are forced to consume specific media programming regardless of how inefficient or ineffective it may be. By applying variation-aware concepts to media program development in this example, companies can save a significant amount of time communicating with their employees.

For instance, in the corporate communication world, a company might send out an hour-long audio training tape to 1,000 sales people to listen to in their cars. If the average sales person human resource allocation costs $100/hour, this audio training represents an investment of $100,000 in human capital. Unfortunately, perhaps as much as 25-50% of all of the information presented on such an audio tape may be off target for any given subset of the audience (e.g., above or below their knowledge level and/or not of interest to the person). By using variation-aware methods to "carve out" that information that is relevant to each listener, a company could cut the program length in half for the average listener, meaning an investment of only $50,000 of human capital for the audio training, among other benefits.

Embodiments that can be used for creating multiple variations of news or entertainment media programs can also be of value. For example, in the entertainment world, broadcasters struggle with how to make programs and advertising more relevant to today's audiences. One response to this has been to move away from the "30 second spot" toward more product placements.

However, one problem with product placements is that they cannot be dynamically changed using currently utilized systems for custom ad insertion or customized media, because such systems are based on media that is broken down into discrete segments. Current custom advertisement insertion assumes that there is a commercial break, that a system dynamically inserts a commercial for a specific end user or group of end users, and then the program resumes. But what if the ad is a product placement where the character walks by a kiosk at the mall? Embodiments of the present disclosure can allow a production company to have the character walk by a Timex® kiosk in one variation and a Starbucks® coffee kiosk in another.

The embodiments of the present disclosure can be used to drive any type of media production process. For example, in the field of television news, embodiments can allow for the creation of one variation of a news story for families where a war is shown with no graphic violence and another variation with highly graphic visuals and an additional sound byte with a very belligerent resident impacted by the violence. Or, in another news example, it may cause rock music to be played behind the sports scores for a younger audience and jazz for the older audience.

In the field of comedy and drama production, a producer, using an embodiment of the present disclosure, can cause the inclusion in a scene of joke about Los Angeles for the New York audience and vice versa. Further, in a drama heavy with product placements, an embodiment may be used to show the actor drinking a beer for the adult audience but drinking a brand-name soda for the younger audience.

In various embodiments, a device can be designed to produce a number of coherent episodes of the media program from the identified media elements. In such embodiments, each resulting variation is not only a combination of media elements chosen from a repository of potential media elements (e.g., different scenes or storylines within a show chosen from a number of scene or storyline candidates for the show), but can be made up of unique media elements produced according to the entire potential breadth of the subscriber variation database (e.g., the inclusion of different graphic, audio, and/or video media particles, such as product placements, depending on the subscriber variations).

In the present disclosure, a number of method, system, and device embodiments are provided that can be used to provide the benefits discussed above among others. The embodiments described herein should not be viewed as limiting, but rather, the limitations of each separate claim should be the limiting factors for that separate claim.

Various embodiments can provide a variation-aware media production device to allow a producer of media content to create multiple variations of an instance of a media presentation to more efficiently meet the information and entertainment needs of the presentation's audience. A media production device can, for example, include a processor and a memory having instructions executable on the processor, including instructions to allow a producer of media content to define a number of variating dimensions for a media presentation.

Such media production devices can be any computerized device that can be used to edit media content. For example, the device can be a computer server; it can be a computer terminal such as a desktop, laptop, or portable computer device; or it can be a proprietary computer-like device. The device may or may not have an Internet connection or other types of network connectivity.

Some device embodiments can allow a media producer (e.g., a person or persons with overall responsibility for creating a media presentation) a way to define or cause to be defined at least one dimension along which the producer expects the audience to vary. In various embodiments, the type of variating dimensions used for a production (i.e., dimensions that can be used to determine how to vary the presentation's content) may differ from production to production.

For example, some of the common variating dimensions that could be utilized to impact an instance of a media presentation in some embodiments can include: demographic information; credit scores or other representations of credit-worthiness; past purchase behaviors of the subscriber; personal interests; physical characteristics of the presentation desired by a subscriber such as file size (e.g., in bytes), technical quality (e.g., compression ratio) or run-time length (e.g., hours, minutes, and seconds); rating element preferences, such as the amount of sex, violence, nudity, or offensive language; test scores or other measures of an individual audience members' knowledge or mastery of subject matter; or individual identifiers such as email addresses, social security numbers, user IDs or any other personal identifier. In a corporate communications embodiment, for instance, additional variating dimensions can also, or in substitution for one or more above, include the breadth of technical aptitude, tenure in an industry, rank (executive, middle-management, front-line) and functional department (e.g., HR, IT, Sales, operations, R&D, Legal, Marketing, engineering, etc).

These and/or other variables can be identified in databases that are used to produce the variations in various embodiments of the present disclosure. In various embodiments, the number of variating dimensions in such database tables can be effectively limitless. In some embodiments, the tables can be actively updated to include new variable types or changes to the types present in the database tables.

In various embodiments, at least one subscriber variation database table can be created with a first set of variating dimensions to define a number of subscribers in terms of the variating dimensions. In various embodiments, at least one media element database table can be created with a second set of the variating dimensions to define a number of media elements in terms of the variating dimensions.

Individual records (e.g., rows of the table) can be populated into the database tables in a number of ways. For example, in a subscriber variation table, a producer can create a number of individual subscriber variation records. These records can then be uploaded to a system server, for example. This type of population process can be particularly beneficial when used in embodiments designed for a private audience, such as a corporation's employees or members of a trade organization, among other embodiments.

In various embodiments having a media elements table, a producer can create the media element records one at a time as new content is produced or, in those cases where the media elements are pre-produced, such as when media elements are purchased or licensed in bulk from a third party producer of variation-aware or non-variation-aware content, the records for these elements could be uploaded in bulk as well.

Some embodiments can use multiple subscriber variation tables and/or multiple media element tables. When at least one subscriber variation table and/or media element table is present, the one or more tables can be queried prior to defining a variation of an instance of a media presentation and a number of subscribers can be defined according to a first set of variating dimensions and a number of media elements can be defined in terms of a second set of variating dimensions.

In some embodiments, a web page can be set up such that it allows individual end users to subscribe to the program thus creating an individual subscriber variation record. Such an embodiment may be particularly beneficial in a system designed for an open public audience.

When a system embodiment includes at least one database that has been populated with at least one subscriber variation record and at least one media element record, a producer can begin or cause to begin, a post-production process whereby a production device embodiment defines a variation of an instance of the media presentation for at least one of the number of subscribers by comparing a first set of variating dimensions for the subscriber variation with a second set of variating dimensions for at least one of the number of media elements. This can be done in order to determine which elements and in what order the elements are to be included the variation of the instance of the media presentation.

For example, if a producer defined two variating dimensions for a program, such as gender and age group, then both the subscriber variation table and the media elements table can contain sets or subsets of these variating dimensions that can be used to represent each subscriber variation and/or media element in terms of these variating dimensions.

In various embodiments, the subscriber variation table can contain a first set of variating dimensions represented by a number of database fields for each dimension in the first set. Specifically, in such embodiments, two fields in this example may track whether a given subscriber variation is intended for a male or a female and another six fields may track the age group (e.g., Under 18, 18-29, 30-39, 40-54, 55-70, 71+).

In such embodiments, both fields can be controlled using a control mechanism (e.g., a simulated control, such as a radio button) in which one of the two fields (e.g., for the male/female dimension) or one of the six fields (e.g., for the age group dimension) will be equal to binary TRUE and the others will be equal to binary FALSE. Other control types can also be simulated. The use of more or different control types can allow for the variating dimension to be represented in more or fewer database fields. For example, the gender dimension above can, in some embodiments, be represented in a simulated drop-down control in which a single field holds the value "Male" or "Female."

In the context above, the term "simulated" in referring to a radio button or other types of controls is intended to describe how a traditional radio button from a web-based form or Graphical User Interface (GUI) could be recorded into the database itself. It does not mean that an actual web-based form or GUI must exist to create such a record in a database, but if indeed a web based form or GUI was used, the control type in the form or GUI can be that which is being simulated in the database.

In some embodiments, the media element table can contain a second set of variating dimensions represented by a number of database fields for each dimension in the second set. Further, in some embodiments, a number of different simulated control types can be used to represent each variating dimension in the second set and the control type used does not have to be the same as the control type used for the corresponding dimension in the first set of variating dimensions.

For the above example, a two field simulated checkbox control can be used for the gender dimension in the media elements table and a six field simulated thumbwheel control with values of 0 through 9 can be used for the age group dimension. In such an example, the program's producers can "check the box" for male, female, or both, which allows control over whether a media element is eligible for inclusion in subscriber variations directed at males, females, or both.

In some instances, the thumbwheel type control for age group in the above example can allow producers more control than a checkbox by allowing a number to be assigned from 0 though 9 for each age group, such as: ("Under 18")=0, ("18-29")=2, ("30-39")=4, ("40-54")=8, ("55-70")=7, and ("71+")=6. Using this approach, in some embodiments, can allow for a score to be created that represents a propensity for a given media element to be included in a given subscriber variation as opposed to a definite "true" or "false". In this example, those subscribers "Under 18" would not be eligible to receive the media element and those 18 years old and over would have various propensities to receive the media element depending on what age group was identified in the first set of variating dimensions.

In various embodiments, scoring control types can be chosen by a media producer that allow the effect of two controls to be combined when evaluating whether a given media element is to be included in a variation. For example, a media element may be targeted at subscribers 30-39 years old with incomes above $100,000, subscribers age 40-54 years old with incomes over $75,000, or any subscriber more than 55 years old regardless of income.

This could be accomplished a number of ways. For example, one way is to use scoring control types to effectively combine the results of these two variating dimensions into a single composite dimension. This can be accomplished by directly combining the data tables in a query or through use of executable instructions to determine an appropriate result based upon the two variating dimensions.

As such, comparing a first set of variating dimensions with a second set of variating dimensions can be accomplished, in a simple example, by comparing one checkbox control from the first set with one checkbox control from the second set. In some embodiments, executable instructions, in a complex example, can combine a large number of diverse variating dimensions from the first set into a composite dimension and compare that result with a comparable corresponding composite dimension from the second set.

Furthermore, in some embodiments, a device can compare non-corresponding composite dimensions from the first set with non-corresponding composite dimensions from the second set. In various embodiments, the result from a number of comparisons of variating dimensions can be combined into a single composite resultant comparison of the variating dimensions. In some embodiments, a number of comparisons of subsets of the variating dimensions can be completed in succession to arrive at a single composite resultant comparison of the variating dimensions.

In various embodiments, the number and types of scoring algorithms can vary from media presentation to media presentation. In addition, in various embodiments, each variating dimension can be associated with a different scoring algorithm. In some embodiments, scoring algorithms can include complex math and may yield integers, decimal numbers, and even negative numbers to represent the probability that a given media element will be included in a variation.

In some embodiments, using multiple or more complex scoring algorithms can be accomplished by the employment of multiple iterations of a variation-aware scoring process to achieve a desired result. This may be of value when a producer wants to evaluate the news segments in one iteration, the weather segments in another iteration and the sports segments in yet another iteration.

The scoring algorithms used for a media presentation, in various embodiments, can be selected from a number of algorithms pre-programmed into a variation-aware production device or can be a novel algorithm developed by the program's producers.

In various embodiments, variating dimensions are grouped into classes to help traditional media producers adapt to the new production process. For example, in some embodiments, three classifications of variating dimensions are used such as "Selec" dimensions, "Score" dimensions, and "Shape" dimensions.

For example, a television news producers learning variation-aware processes can be taught that the selecting ("Selec") dimensions can be used, in some embodiments, to automate their selection of segments ("what news stories should we prepare for the evening news tonight?"). Scoring ("Score") dimensions can be used, in some embodiments, to automate their determination of what order the segments may be included in ("which segment should be our lead story and which teaser should we dangle out there so people stay until the end of the show?") Shaping ("Shape") dimensions can be used, in some embodiments, to automate the decision making process that takes place while assembling a segment ("What shots, sound bites, and graphics should we include in the story about the big fire?").

More specifically, in embodiments that use these classes of variating dimensions, "Selec" dimensions can be used to represent permissions that can be defined as absolute. For example, audience ratings (e.g., people under 17 should not be eligible to see this media element) or corporate rank (e.g., one must be an executive to hear the following message) can be defined in various embodiments as absolute permissions.

"Score" dimensions can be used to represent appropriateness measures such as sex/age (e.g., this content is more appropriate for 35-49 year old males but is not specifically restricted to such) or content interests (e.g., this content is highly appropriate for Minnesota Vikings fans but significantly less appropriate for Green Bay Packer fans). Such Score dimensions can often be used by producers to select between multiple media elements when both are eligible to be included in a variation of an instance or to sort media elements by importance when an exact order is not required to make a coherent media presentation (e.g., in a newscast where the stories are typically ordered from most important to least important with a few highly important teasers held until the end of a broadcast to keep the audience tuned in).

"Shape" type variables can be used within the logical tests of variation-aware media element scripts to change the media particles included in variation-aware media elements (e.g., if 'head of household' then show the character walking into H&R Block or else show the character walking into Toys 'R Us). Shaping can be especially important in a corporate communications world, where everyone may have to receive training on the same new product (e.g., may have to receive the same media element), but the content that gets included in each subscriber variation can vary depending upon the rank, tenure, and technical aptitude of each subset of the audience.

It is important to note that differentiating between selecting, scoring, and shaping dimensions can be a minor semantic to help the producers of traditional media understand variation-aware concepts. Selecting, scoring, and shaping can be three similar kinds of the same variation-aware concept in which an algorithm can be used to compare a first set of variating dimensions from a subscriber variation table against a second set of variating dimensions from a media element table. In the case of some dimensions, for example those dimensions within a variation-aware media element script, one can effectively define a second set of variating dimensions directly in a logical condition instead of entering the second set into a database first. In this example, the first set of variating dimensions can be compared against the logical condition, which can be an algorithmic representation of the second set of variating dimensions, among other methods.

Such processes of comparing a first set of variating dimensions for a subscriber variation with a second set of variating dimensions for a number of media elements can result in the definition of an ordered list of media elements that can be included in a variation of an instance of a media presentation. In some instances, the default order of media elements may not be the most desired and the media producer can choose to sort the list. For example, if certain control types are used that yield propensities or scores for the media elements, then these propensities or scores can be used to further sort or change the order of the media elements within the variation.

In some embodiments, once the variation of an episode of the media program is defined, the defined variation of the media program can be run through additional iterations of the definition process to include additional media element insertions such as program openings, closings, credits, production company IDs (e.g., names and/or logos), advertisements, and/or copyright notices, among other items.

In some embodiments the first set and second set of variating dimensions can be subsets of the variating dimensions defined for the overall media presentation. For example, a production may have variating dimensions that are used only to identify media elements and not subscriber variations or vice-versa. In another example, a media program can use media elements that are defined by a publication date dimension and/or an expiration date dimension such that the element is only made available to a production device for inclusion in an instance between those two dates.

In some embodiments, a record in a subscriber variation table can represent a group of multiple end users. In such embodiments, a producer can choose to create a number of different records representing prototypical subscriber groups and decide to let the individual subscribers be affiliated with the group that most closely matches their individual subscriber profile. Such an approach may be desirable to keep down the cost of producing a large number of variations, especially in cases where the audience is large.

Some embodiments can initially place subscribers, including those who have not yet registered with the database, into a generic subscriber group affiliated with a default subscriber variation record and, as more is learned about the subscriber (e.g., through such means as feedback from the subscriber's playback device, by surveys, and/or by a number of other means) that subscriber may become affiliated with a different subscriber variation record. In various embodiments, the affiliation process can be done manually or through a computerized process.

In some embodiments, media elements can be grouped together such that the records in the media element table or tables represent groupings of media elements. While this may be less flexible than having each media element correlate with an individual media element record, it can provide a lower cost production process for some types of media presentations.

This approach, for example, may be used when a producer wants to create a common core program and personalize the advertising inserted for the different subscriber variations. Such an approach may be quite popular as it presents an easier way to get started with variation-aware media production.

Some embodiments can be designed to use more than just subscriber variation and media element tables in the process of defining which and/or what order media elements are to be included in a variation. For example, one other type of data table is a feedback table, where data about subscriber behavior in consuming previous instances can be collected and can be used in the determination of which elements and in what order the elements will be included in a variation of an instance of the presentation. This data can be collected when a presentation device feeds back data to a production device and/or when an end user provides feedback through a survey or other type of feedback instrument.

For instance, consumption behavior may be collected that includes detail about how and when the subscriber listened to or watched previous instances of presentations which can then be used to improve the future instances and predictive models. For example, if an end user is always fast forwarding through a technical element of an audio podcast to consume a less technical element, an inference about preferences or technical ability could be incorporated into the feedback table of the media production device to affect future instances (perhaps causing the inclusion of less technical stories and more elementary ones). In some embodiments, if a subscriber always fast forwards through commercials for prescription medicine on a video podcast but always watches the car commercials, that feedback can be incorporated into the database such that more car commercials and less drug commercials are delivered to that subscriber.

Any type of feedback that can be gathered about a subscriber that can affect the variation of the media program can be utilized to do so with the embodiments of the present disclosure. For example, GPS or cellular triangulation location information collected at the time a media file was consumed of as well as the date and time information relating to when media files are consumed can be used to aid in determining what elements to include in future instances for that particular subscriber.

Some embodiments may also include tables with information purchased from a third party such as credit card purchase histories, credit scores, or any other information that producers feel will enhance the value of their variations to subscribers or advertisers. For example, database tables that can be queried to define a subscriber variation may not show any purchase history of baby products, but predictive models might take age and marital status into account to determine the likelihood that baby products would be purchased in the future and use that information to define a subscriber variation.

In various embodiments, the media elements defined by the production device can be edited together into a number of media files to create the variation of the instance of the presentation. In various audio or video production embodiments, this can be a single media file or multiple media files. In various textual production embodiments, this can be a single PDF or HTML file or multiple such files.

In various embodiments, a variation definition created by a production device can be recorded in a variation definition file. In such embodiments, the variation definition can be comprised of an ordered list of media elements. In some embodiments, the variation definition file can be stored in volatile or non-volatile memory, such as in RAM, ROM, or Flash memory.

In some embodiments, the production device can immediately edit together the media elements into a number of media files representing the variation of the instance of the presentation. In some embodiments, the production device can wait until a later time to edit together the media elements, such as when the variation is actually requested by an end user affiliated with a subscriber variation.

Some embodiments may not edit the media element files together into a lesser number of composite media files but, rather will, upon request send a number of media element files to a media presentation device.

In some embodiments where a number of media element files are sent to a media presentation device, a variation definition file can also be sent which can allow the presentation device to sequentially present a number of media element files. Such embodiments allow the presentation of the variation of the instance of the media presentation as if a number of media files had been edited together into a lesser number of media files.

Some embodiments can also include a variation navigation file that, like the variation definition file, can include a list of a number of media element files used to make up a variation of an instance of a media presentation. However, a variation navigation file can also include other information, such as temporal location information that specifies a start time of each media element in the larger media presentation. Such a variation navigation file can, for example, include additional information such as descriptions about the media element (e.g., a verbose description akin to a TV listing that would describe each media element in more depth). Such embodiments would allow an end user to navigate within a larger media presentation and can be designed to be similar to the table of contents in an electronic book that can allow a user to click to a specific location within a larger presentation, among other forms.

Some embodiments that include a variation navigation file can include permissions for a number of individual media elements within a variation of an instance of a media presentation that indicates how and in what manner an end user can control the presentation. For example, in some embodiments, a file may have permissions that instruct a presentation device to disallow fast-forward on commercial messages or, in a corporate environment for example, on legally important announcements such as "safe harbor" statements.

Some embodiments that include variation navigation files can include instructions on how to present parallel media content, which can, for instance, include content to be presented along with the main content such as an announcement or advertisement that is superimposed on a video screen or a visual message that is displayed on the control screen of a smart audio device, such as a PDA/smartphone.

Some media programs produced using an embodiment of a variation-aware media production device can use media elements that are made up of a number of media particles that were created according to and/or are identified in a variation-aware media element script. Such media particles can be included in the element when the first set of variating dimensions for the subscriber variation are compared against an algorithmic representation (e.g. a logical test) of the second set of variating dimensions. Such a logical test can be used to determine whether each media particle is included in the variation of the media element. This concept is explained in more detail with respect to the post-production process discussed herein.

Media elements that were created according to a variation-aware media element script can be, but do not have to be produced using an embodiment of a variation-aware content authoring device. One such embodiment of a variation-aware content authoring device is described with respect to FIG. 5.

Media production device embodiments of the present disclosure can also be used as one component of an overall system for producing and/or distributing variations of instances of media presentations. Such a system can include a number of components, each of which may be provided as a device or as part of one or more devices having one or more other functions.

In various embodiments, a system can include a media production component, such as the media production device embodiment described above. In such embodiments, the media production component can define a variation of an instance of a media presentation for at least one subscriber by comparing a first set of variating dimensions for the subscriber variation with a second set of variating dimensions for at least one media element and determining which elements and/or in what order the elements are to be included a variation of an instance of the media presentation.

A system embodiment can also include a distribution server component, which in some podcasting embodiments for example, can be a web server configured to work over the Internet. In some embodiments, the distribution server can be a media server that, for example, is located in the headend of a cable company. In some embodiments, the distribution server can be a media server that can be, for example, located in the data center of a cellular telephone carrier. In still other embodiments, the distribution component can be an email messaging server or an instant messaging server. In some textual-based embodiments, the distribution server can be a web server that presents HTML-type web pages to an end user's browser or other presentation device.

A system embodiment can also include a telecommunications network component, which can be any network component that is used to communicate information. For example, in some embodiments the telecommunications network component can be a component of a radio network, satellite system, cable system, DSL network, fiber optic network, frame relay, private line, IP or ATM network, the public Internet or a private intranet, or wireless cellular-like data networks such as GSM, CDMA, EVDO, EVDV, WiMax, 802.16e, and HSDPA, or another network for passing information.

A system embodiment can also include a presentation component, which can be any component capable of displaying and/or otherwise playing back textual, audio, and/or video media, among other formats. In some embodiments, presentation components can include a stand-alone hardware-based media player, such as an audio or video iPod, or other such device, that can be associated with a computer to download podcasts or other media presentations. In some embodiments, the presentation component can be a combination of hardware and software such as a cable set-top box or a radio, car stereo, or television with media presentation capabilities.

In some embodiments, the presentation component can be a computer-based device, such as a personal computer, a PDA, a smartphone, or other device, such as devices that run software to provide the functions of media downloading and media playback. In some embodiments, such software may be, for example, a podcatching client and a media player or, in another example, a web-browser, a PDF viewer or other computer-based presentation software.

In some embodiments, the presentation component can be a combination of hardware and software such as a cable set-top box or a radio, car stereo, or television with media playback capabilities.

In some embodiments, for example, those used for media programs with a small number of subscribers, the functionalities of the media production component and distribution server component can be combined into a single device.

In some embodiments, the system described above can create a number of podcast feeds for each variation of the instance of the media presentation to be placed on the distribution server component. For example, podcast feeds can be based on RSS standards and include XML documents with enclosure references that instruct a presentation device how and/or where to download the media files that make up the media presentation.

Some system embodiments can use a distribution server component to track all of the instances that have been defined and/or created and the corresponding files that have been sent to a presentation component. In such embodiments, the server can also be designed to send executable instructions to the presentation component to cause the deletion of a number of files associated with an instance of a media presentation stored on the presentation component. Such embodiments can be used, for example, when a corporation wants to delete all of the files on a device belonging to an executive that has left the company, to help end users manage storage space on their presentation devices, or to ensure that media cannot be played back after its expiration date, among other uses.

The present disclosure also includes a number of embodiments of a media content authoring device which allow an author of media content to use a number of variating dimensions to create a number of logical conditions which are associated with portions of a media element script such that an output produced, such as when the media element script is processed through a variation-aware presentation engine, varies for a subset of the audience based upon an that audience subset's profile according to the variating dimensions.

In some embodiments the media content authoring device can be a personal computer. In such embodiments, the media content authoring device can include either software on the device or software that is accessed via a connection to a server hosting media content authoring software.

In various embodiments, the output being produced by a presentation engine can, for example, be textual, such as that produced for magazines, web pages, or emails; it can be aural, such as that produced for radio programs, audio books, or corporate communication; or it can be visual such as that produced for television programs or multimedia presentations, among other output formats.

Within variation-aware media element scripts exist a number of particles. The term particle can be used to refer to each portion of a media element script that is associated with a logical condition. The term particle can also be used to refer to the media file that a portion of a media element script refers to. For example, the text on a script that says "Good morning boys and girls" could be called a particle as could the corresponding audio file whereby an announcer is saying "Good morning boys and girls". Media particles referred to in such scripts can, for example, be audio clips, video clips, graphics clips, keyable graphics titles, sound effects, background music, data for closed-caption purposes, or data for parallel presentation on the end user's device (such as when an item is displayed on a control screen of an ipod or car stereo instead of presented as part of the audio file played back).

In some embodiments, media particles can be text-only based elements for output to paper, web-pages, PDFs, books, and other forms of written media. In some embodiments, media elements can be audio-only based elements for output to stereos, personal audio devices such as cell phones, walkman-type players, mp3-type players, and iPods. In yet other embodiments, media particles can be audio-visual elements for output to televisions, video projectors, flat-screen displays, computers, video iPods, and other personal and group viewing apparatuses.

A variation-aware media element script produced by such device embodiments can contain logic about what particles are to be included in a variation of an instance of a media presentation. For example, the author of a corporate training podcast may want a sales representative newly hired into the industry to hear an explanation about a new product that is very elementary, without the inclusion of industry jargon. The author may also decide that a highly technical and tenured sales engineer may prefer to hear a quick, jargon-rich passage effectively saying the same thing, but much more efficiently because it is in the vernacular of someone rich with experience.

In such instances, the author may begin in a traditional fashion: writing some broad, overarching script for the "everyman." Then, at any point during this process, when the author realizes that he would like to tweak the output differently for different audiences, the author can create a logical condition that can be used to effectively create multiple paths of content for different audience populations.

Another approach, that can be utilized with embodiments of the present disclosure, can be for the original author to write a broad, overarching script in its entirety and, then, for subject-matter and/or technical experts to come along after the fact to add logical conditions to the script and change and/or add particles for specific subject matter areas thus creating additional variations of the original script for a variety of audiences.

One advantage to the latter approach is that one subject-matter expert does not necessarily have to know what the other subject matter experts are doing for all of the variations to be coherent. For example, an engineering expert could modify the original script and add variations for those more technical audience members while another expert could modify the message for those employees supporting different business market segments (e.g., small business, mid-market, Fortune 500).

The result of such small tweaks might be six different variations of a media element along two dimensions (technical aptitude and market segment). That said, this is an overly simple example, as the variation-aware embodiments described herein can be designed to accommodate many more dimensions and can yield hundreds, thousands, or even millions of possible variations of content.

In some embodiments, variation-aware authors can create a variating point by developing a logical condition based on a set of variating dimensions, such as "Industry Tenure <10 years". This logical condition can be associated with a particle such that two variations can be created for the audience: one variation targeted at people with less than 10 years of industry experience and another for everyone else. If this logical condition was the only one used in a variation-aware media element script and was placed in the middle of the script, four particles would be present in this script: (1) the common portion prior to the logical condition, (2) the portion after the logical condition intended for the lowly-tenured audience, (3) the portion after the logical condition intended for the highly-tenured audience and (4) another common portion at the end intended for the entire audience. This may be an overly simple example, but in such embodiments, any number of potential variations could be created using the variation-aware scripting approach. In fact, the number of potential variations multiplies very quickly with the addition of each variating point.

In some embodiments, the complexity of these logical conditions at a variating point can become very complex. For example, one such complex logical test could be [(18<=Age<30&Sex=Male)||RolePlayingGameTime>65%], which could cause a media element to be produced in which a unique particle was applied to men ages 18-29 or to people who spend more than 65% of their game playing time playing role playing games.

In some embodiments, a logical condition can include temporal factors. For instance, one or more temporal factors can be used to create a media element that includes only that information which has changed since the last time the media element was produced for a given subscriber variation. For example, a test having a temporal factor provided therein [LastInstance<1/1/2006] can be used to trigger the inclusion of a media particle only for those subscriber variations which had instances last produced prior to Jan. 1, 2006. In another example, two related audio media particles could be created such that one was used before a certain date and another after a certain date, such as (1) [date<1/1/2006] "On January 1, we will launch our Durabuilt line of . . . " and (2) [date>12/31/2005] "On January 1, we launched our Durabuilt line of . . . " In this example, two particles are provided in the media element script such that the output presented uses the future tense before a Jan. 1, 2006 and the past tense after Dec. 31, 2005.

In various embodiments, the media content authoring device can be designed to allow an author to view and/or output a script from various perspectives. In other words, they can set any state of a first set of variating dimensions and see what content would be produced for that subscriber variation. In this instance, the content authoring device can be used to serve as a presentation engine. Such embodiments can make it easier for various subject matter experts or editors to view the content from various perspectives.

In various embodiments, the variation-aware presentation engine can be a variation-aware media production device, which can edit together media files based on the instructions found in variation aware media element scripts. In some embodiments, a variation-aware presentation engine can be a bulk email server, which can create variations of emails to each member of a mass mailing list, among other devices.

For example, in various embodiments, a variation-aware presentation engine can be a variation-aware text-based server, such as a web-server with variation-aware plug-ins, that can present variations of web content to web browsers. In some embodiments, a variation-aware presentation engine can be a standard web-server that can present the full variation-aware media element script to a web browser whereby a web browser with a special plug-in can parse and/or filter the script to appropriately present the variation of the instance of the media to be presented.

For example, various embodiments can be used to provide a script that can be filtered for interpretation by various people or systems or end users. For instance, various embodiments can be used to provide a "shooting script" that can be used to help producers, videographers, sound recording technicians, voiceover artists, and editors produce the particles called for in the script. In some embodiments, the branches of the script can be viewed from a macro perspective. Such functionality can be helpful in seeing the different points at which the script branches in due to different variating dimensions and/or the subject matter to be covered in the different branches, among other benefits.

In some embodiments, an email can be generated by a variation-aware email presentation component that can include a transcript of an audio presentation that was produced when the same script was run through the variation-aware media production device. This can be achieved when the media production device acts as a presentation engine for both audio and text.

For example, a media particle in a variation-aware media element script can include both a textual representation of the particle and a link to an audio file of an announcer reading the textual representation. When the presentation engine is assembling the audio for the variation, it uses the link to the audio file to assemble the content. When the presentation engine is assembling the transcript for a variation, it uses the textual representation to assemble the content. Thus, both an audio variation and a transcript can be produced from the same variation-aware production script.

Some embodiments can also be designed to allow for the encryption of media files. For example, an encryption functional embodiment can be accomplished by creating a hardware identifier for an end user presentation device; sending the hardware identifier to a media production device to create an encryption key; and encrypting a media file by associating the encryption key to the media file such that only the payload of the media file is encrypted and such that the encrypted file can only be played back by the end user presentation device for which the file was encrypted. Other encryption schemes can also be utilized in the various embodiments of the present disclosure.

In such embodiments, hardware identifiers can be taken from serial numbers that are embedded into chips, drives, or other components of presentation devices. In some embodiments, an operating system can provide a hardware identifier to an application. In various embodiments, an algorithm can be used to extract or combine serial numbers from a number of different components within a playback device. Such functionality can be used to create a hardware identifier.

In some embodiments, the hardware identifier can be sent to a media production device. The media production device can, for example, use the hardware identifier to calculate an encryption key that would be known only to the media production device and the presentation device (e.g., the presentation device can be designed to know the algorithm used by the production device to calculate the encryption key).

FIGS. 1 though 5 illustrate one or more embodiments each including a number of features that can be present in the various embodiments of the present disclosure. FIG. 1 shows a block diagram of a variation-aware system embodiment that can be used to produce multiple variations of instances of media presentations (e.g., audio podcasts).

In the embodiment of FIG. 1, the system includes a variation-aware media production component 100. This production component is further discussed with respect to the embodiments of FIGS. 2, 3, and 4, described below. Such production components can be responsible for creating the variations of the instances of the media presentation and/or publishing them to a distribution server component 104 where they can be downloaded and/or pushed to an end user's presentation device 106, among other functions.

The distribution server component 104, of the embodiment of FIG. 1, can be a web server configured to work over the Internet with a variety of standards-based presentation devices and/or a server specially configured to work with proprietary presentation devices and/or over a private network.

In the embodiment illustrated in FIG. 1, the system includes a presentation component 106. The presentation component can, in various embodiments, be a stand-alone hardware player such as an iPod that tethers to a computer to download media presentations (e.g., podcasts) or it can be a computer-based device such as a personal computer, a PDA, a smartphone, or other electronic device that runs software to effectively combine the functions of media program downloading and media presentation.

A copy of a variation can be encrypted 101, in some embodiments. For example, the encryption can be utilized for securing the media such that it can only be presented back on a single presentation device. For instance, an end user's presentation device can register 107 with the production device by providing the production device with a unique encryption identifier based on, in some embodiments, a compilation of the unique hardware serial numbers found within the presentation device. In some embodiments, this encryption identifier can then be used by the production and presentation devices to create a different encryption key that is known only to the production device and the presentation device.

Such an encryption process can be accomplished, for example, by intelligent devices that have telecommunications connectivity and are capable of running software. Examples of such devices include personal computers, PDAs, and smartphones.

Such an encryption process can be accomplished, for example, for those devices which do not have telecommunications connectivity by having an end user can manually type the encryption identifier into a web page. Such an embodiment can be beneficial for disconnected devices, such as iPods and other disconnected portable devices.

In various embodiments, the XML code (e.g. a podcast RSS feed) for a variation can be created or updated 102 to effectively publish the variation. The media files and/or media file definitions for the variation can then be placed 103 on a distribution server. When media files and/or media file definitions are present on the distribution server 104, an end user can download the content into their presentation device 106, for example, via a telecommunications network 110. The presentation device or, for example, an affiliated podcatching device, can check for new episodes of a podcast by requesting 108 the latest program information (e.g., podcast RSS feed) and checking it for new items. If there are new items, the distribution server will send content 105 to the presentation device upon request.

In embodiments where future variations of the instances of a media presentation can be enhanced through feedback, a presentation device may pass media consumption data 109 to the production device. Such data can, for example, be used to effect how future variations are produced. In various embodiments, the functions of encryption 101, XML generation 102, and distribution 104 can be handled by the production device itself and thus can be considered integral to the variation-aware media production device in such embodiments.

Figure 2:
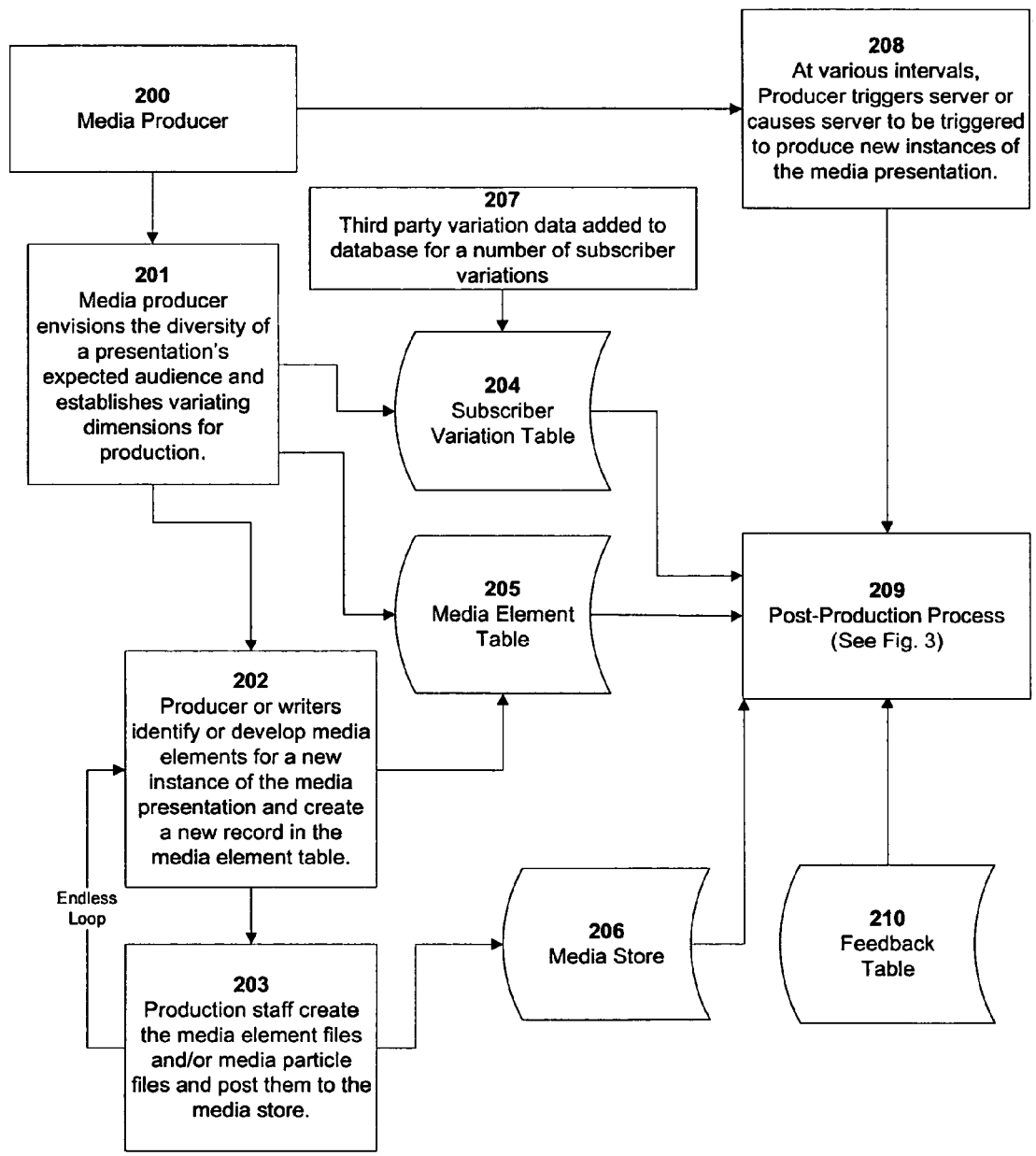
FIG. 2 shows a block diagram of the variation-aware production device shown in FIG. 1.

FIG. 2 shows a block diagram of the variation-aware production device shown in FIG. 1 to further explain how media producers can utilize various features of the device embodiments of the present disclosure. A media producer 200, defines the dimensions along which the audience may vary 201. In some embodiments, dimensions can be added at any time such as between episodes of production.

In various embodiments, the device can create a database table for both the subscriber variation data 204 and the media element data 205.

As discussed above, producers or writers can identify or develop media elements for a new instance of the media presentation 202 based upon the defined variating dimensions. These media elements could be produced internally (e.g., by the program's production staff) or externally (e.g., by a third party). In such embodiments, the production staff has to determine how the media element for the new instance differs in terms of the second set of variating dimensions. The production staff can then create a record in the media element table to represent the media element.

Figure 5:
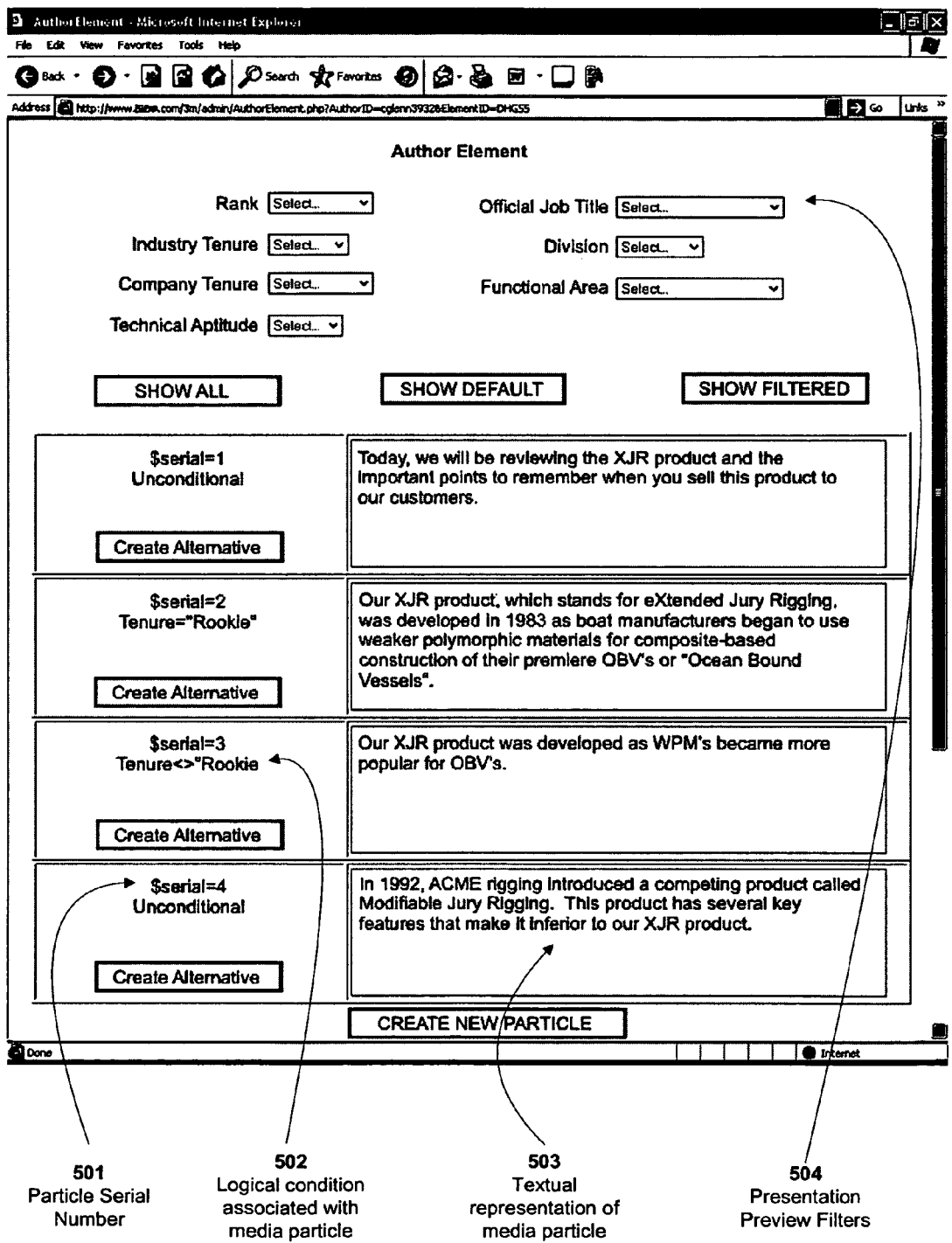
FIG. 5 shows an embodiment of a media content authoring device which can be used to author variation-aware media element scripts.

If a media element is being produced internally, the producers or writers would typically develop a script for the media element. Such a script may or may not be developed using a variation-aware media content authoring device as shown in FIG. 5.

In some embodiments, the identified media elements for a new instance and any associated scripts can be handed off to production staff who create 203 the media element files and/or any associated media particle files by create any textual, audio or video dictated in any media element script (for example, recording the narration of a voice-over artist, videotaping a scene of a sitcom, and inserting superimposed graphics over a slice of video). In some embodiments, the production staff may also edit the media element to ensure that it conforms to any variation-aware technical standards for text, audio, and/or video.

The media files can be stored in the media store 206 in various formats (e.g., .wav files for audio, .mpg for video, .gif for superimposed titles, .txt or .xml for text-based media).

Once all of the media elements for a new instance of the presentation have been produced, the post-production process can be triggered 208 either manually, such as by a producer who, for example, on a weekly or daily basis tells the server to begin production; or the process could be triggered automatically, through use of a variety of thresholds that are related to time, the amount of new content produced, or other such factors.

In various embodiments, the process by which multiple variations of an instance of a media presentation are created can be shepherded by the interaction of the subscriber variation table 204, with the media element table 205 through the post-production process 209, which performs the editing of media elements into a coherent variation of the instance of the media presentation. In some embodiments, feedback data from the presentation devices 210 can also be used to influence the post-production process and effect the variations created by the device. In various embodiments, such as that shown in FIG. 2, third party variation data 207 can also be used to influence the post-production process.

Figure 3:
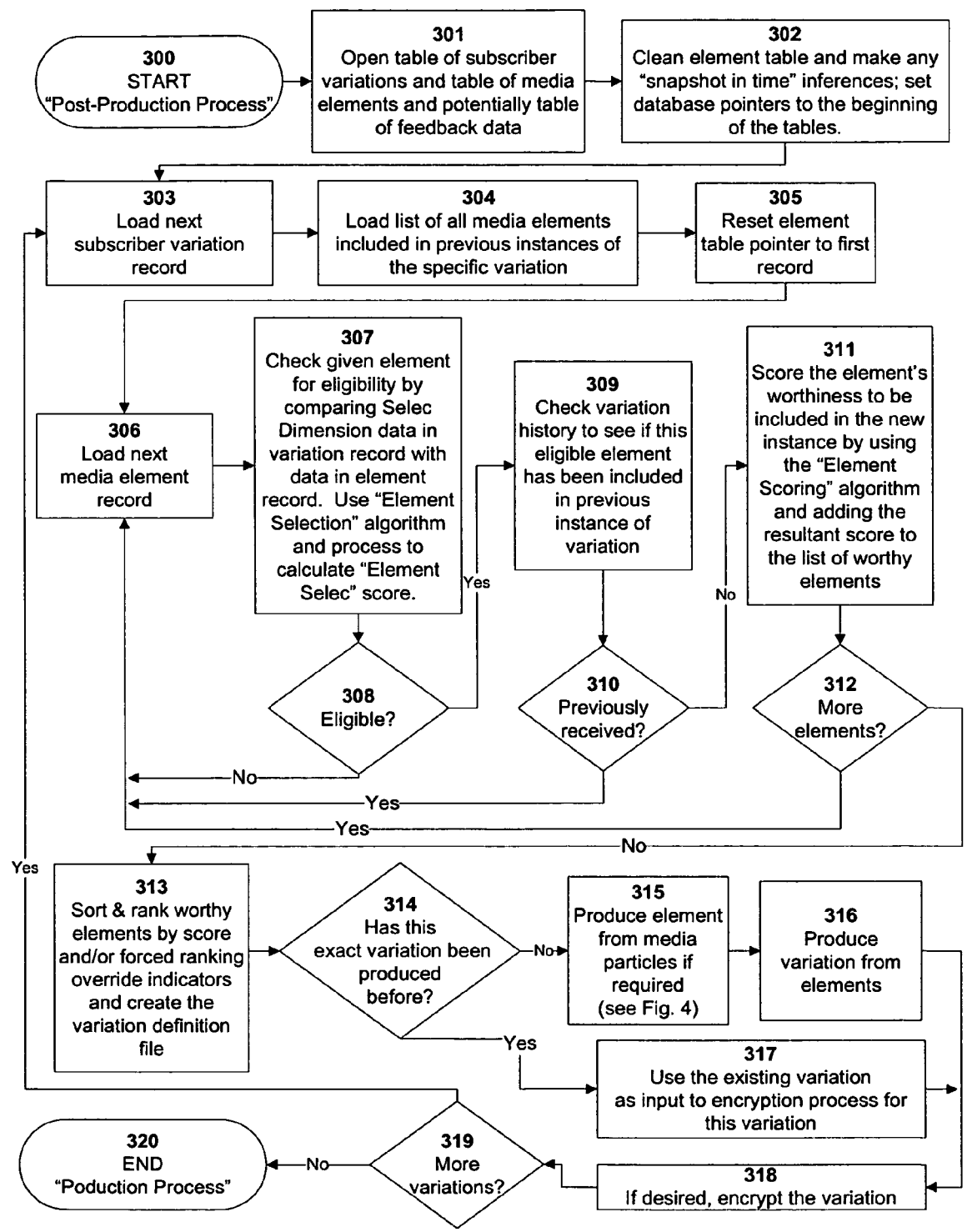
FIG. 3 is an amplification of the post-production process performed by the variation-aware production device in FIG. 2.

FIG. 3 illustrates the post-production process performed by the variation-aware production device in FIG. 2 in greater detail. In an embodiment including the post-production process of FIG. 3, the post-production process can begin 300 by opening the database tables 301 and by taking "snapshot in time" actions 302, such as cleaning out the media elements table of expired media records intended for previous instances, among other functions.

Then, in such embodiments, an individual record in the subscriber variation table 303 can be loaded. This record can contain all information about the subscriber variation to be produced including a first set of variating dimensions. The device, in various embodiments, can then examine a list 304 of all media elements included in previous instances of that subscriber variation to be used later in the process to ensure that subscriber variations do not receive any previously received content.

The database pointer can then be reset to the beginning of the media elements table 305 and each individual record in the media element table can be loaded sequentially 306 and run through a number of scoring algorithms to determine its appropriateness for inclusion in the variation of the new episode of the media program.

Specifically, in some embodiments that use Selec, Score, and Shape classes of variating dimensions, a scoring algorithm can be used such that each "Selec" dimension for the media element can be compared 307 with each "Selec" dimension for the subscriber variation to calculate an overall element section score. If the algorithm determines 308 that the media element does not pass the test, the subscriber variation is not eligible to receive that media element and the next segment record can be loaded.

If the media element is eligible for inclusion in the subscriber variation, then the media element can be compared 309 with a list of media elements included in previous instances of the presentation for that subscriber variation to make sure that no repeat media elements will be included in the new episode. This is desirable in some embodiments because it is possible that producers (especially news producers or producers of corporate information) set up the device such that media elements that go unconsumed can be carried forward to future instances of the presentation. If the element has been previously received 310, the next record can be loaded.

If the media element has not been previously received, the element's worthiness can be calculated 311, for example, by using the "Score" dimensions and/or the chosen variation-aware scoring algorithm. The values for the Score dimensions in the media element table can be used to represent the likelihood that a given media element would be appropriate for a given subscriber variation and conversely the values for the Score dimensions in the subscriber variation table can be used to represent the appropriateness that certain types of media elements would have for a given subscriber variation.

For example, a simple variation-aware algorithm might look at the age and sex information in the subscriber variation records and compare that against the targeted age and sex for a given media element. For instance, if the subscriber variation was targeted at 65 year old men and the media element was a commercial for AARP, then the algorithm would presumably yield a high worthiness score.

In such embodiments, depending on the algorithm chosen by the program's producers, the media production device can use at least two corresponding scores from corresponding variating dimension fields from both the subscriber variation and media element tables and, through use of some mathematical operations, calculate the final worthiness score for that media element in that specific subscriber variation. For example, if the subscriber variation included variating dimensions that captured an end user's interest in the Minnesota Wild (for example, 80%) and a media element for a news program was about a Minnesota Gopher (college) hockey player who might be drafted by the Wild (for which the producers assigned a relevance for Minnesota Wild fans of 80%), then, in some embodiments, the algorithm may multiply the two corresponding fields together to assign a score of 64% for the media element worthiness. This score could be combined with a number of other scores from other variating dimensions to achieve an overall worthiness score for that media element in that specific variation of the episode of the news program.

In some embodiments, after each media element is scored, then the device determines if there are more media elements to be processed 312. If there are, then the next media element can be loaded and so on until all of the media elements have been eliminated or assigned a worthiness score.

In some embodiments, these scores then indicate the likelihood that any given media element will be included in a given subscriber variation. However, in some embodiments, there can still be a number of other factors that could over-ride the worthiness scoring, such as limits that could be placed upon the production such as the running time or physical size of the final program and/or any number of additional factors that force the inclusion or exclusion of specific media elements.

In some embodiments, once all of the available media elements have been analyzed for possible inclusion in a given instance for a given subscriber variation, the list of candidate media elements can be ranked and sorted 313 according to a predetermined method to create a variation definition file. In various embodiments, the elements may be sorted from highest scoring to lowest scoring. In some embodiments, the device may group the segments by category (e.g., news, weather, and sports) and then rank within each category.

In some embodiments, the device may group and rank as described above and then also force in a number of elements into the presentation based on some overriding variable such as a forced insertion flag. This approach may be used to insert opening title sequences or end credits, among other functions.

In various embodiments, once the subscriber variation's variation definition file has been created, then if that subscriber variation has already been produced 314, the device does not have to produce a new copy of the instance of the media presentation but could, rather, point to the previously created instance, or, if encryption was preferred, the preferred embodiment could copy the previously produced instance and use that copy as the input to encryption process 317.

In situations where a new post-production assembly is warranted, then the media elements can be edited together based on the appropriate selecting, scoring, and shaping variables. If there are media elements with variation-aware media element scripts, then those media elements must first be created 315 by running the script through the variation-aware media element production process as detailed in FIG. 4.

After any specified variation-aware media elements have been created, the media elements can be edited together 316 into an episode of the program for that subscriber variation (typically a single audio or video file although multiple files may be used in some cases). The resultant instance can be designed to contain highly customized elements that do not lack internal integrity in terms of storyline or cohesiveness. If high security is desired to protect this media presentation, the files can be encrypted 318.

The system can be designed to continue 319 to produce new subscriber variations to sufficiently serve the entire breadth of the subscriber variation table. After the post-production process ends 320, the production staff can begin production of the next instance of the media presentation.

In some embodiments, after a new set of variations for an episode is produced, the cycle, such as that described in FIG. 2 can be looped such that it begins all over again. New content can be produced before new instances are triggered. This, however, is not a requirement for all types of media programs, such as an audio version of an industry journal.

In such embodiments, the device can be designed to track which media elements have been included in which subscriber variations and if a new instance was triggered before additional media elements were produced, the new instance can include existing content that scored lower than that which was included in the previous instance assuming that additional content was available and that it had not expired. In this example, some of the elements produced for the viewer may be one day old, some three days old and some five days old. As such, this example demonstrates that just because a media producer may choose to produce new episodes of a news program every day, a subscriber may choose to only consume an episode once every week. In these cases, it is possible for the subscriber to receive a single variation that is made up of media elements created for the last five episodes of the news program.

Figure 4:
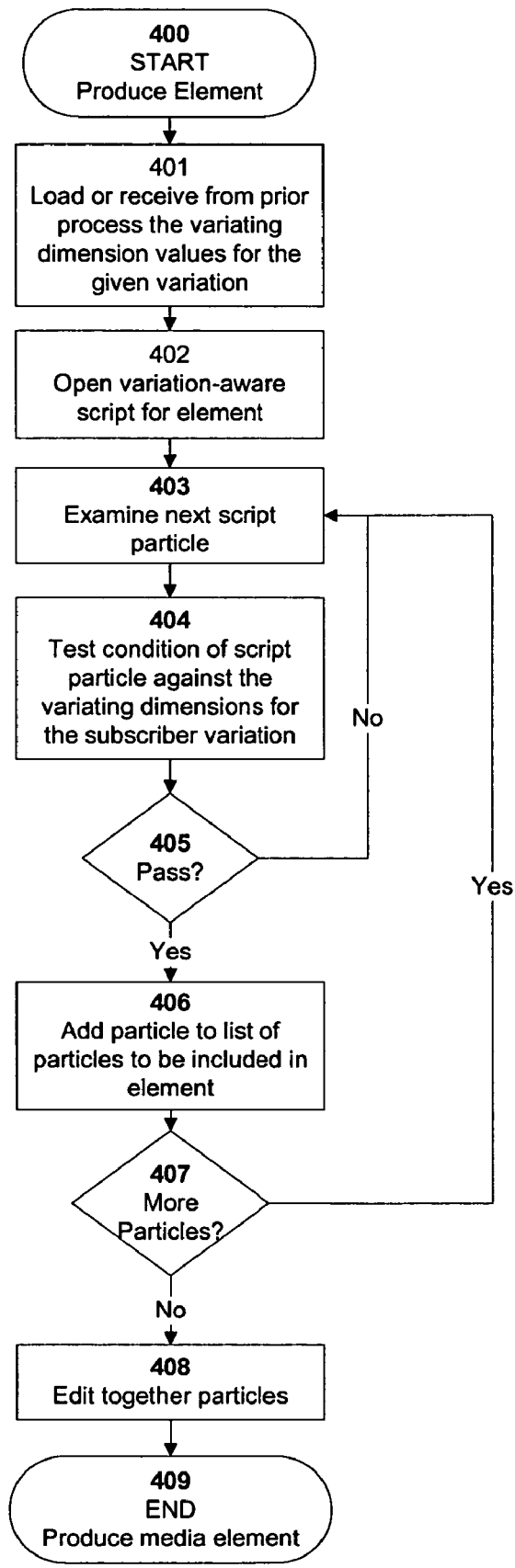
FIG. 4 shows a flowchart for the processing of a variation-aware media element script by the variation-aware production device in FIG. 2 such that the media particles that make up a media element are tested for inclusion in the variation of the media element being produced.

FIG. 4 illustrates a flowchart for the processing of a variation-aware media element script by a variation-aware production engine such as the device embodiment in FIG. 2 such that the media particles that make up the media element can be tested for inclusion in the variation of the media element being produced.

In the embodiment shown in FIG. 4, the process 400 can be accomplished by receiving the variating dimensions for the subscriber variation 401 from the post production process and opening the media element script 402. In the embodiment of FIG. 4, the device can load each script particle in succession 403 and evaluate the condition for the particle 404 using the specific subscriber variation's selecting, shaping or scoring dimensions. Regardless of which classification of dimension is used, this process can be referred to as shaping, as the concept is discussed above. In such embodiments, the logical test can be performed, for example, by using the subscriber variation's variating dimensions as inputs to the script particles' shaping test.

For instance, a test may be run to differentiate the content based on one's technical ability. If the subscriber variation table tracked technical ability (TECH) as being either "high", "medium", or "low", then a logical test could indicate the inclusion of a particle for only those with "high" TECH abilities. If the next logical test in the script was NOT "high" TECH, then those with high tech abilities would get one particle and those with low or medium tech abilities would get another. Accordingly, if this was a radio program for mechanical engineers, the high tech subscriber's program might include an audio particle that says "The multivariate pressure sensor should be set to between 400 and 800 units of dynamic pressure" whereas the low tech subscriber might hear "The pressure sensor needs to be set to the correct setting, which is a task best reserved for those experienced in such techniques."

In various embodiments, the number of variating dimensions can be limitless. And, because there is no limit to the number of variating dimensions in such embodiments, there is no limit to the variations that could be created using the shaping process. The particles tested can be as small as a graphic element such as superimposed titles or as simple as background music.

In addition, in some embodiments, one could use any number of variating dimensions in any number of component logical tests to make up a single logical test. For example, the author of the above example with respect to FIG. 4, could have wanted to present a unique element to those tenured engineers with over 20 years experience in the industry that had been with the company for less than two years. As long as these are being tracked as variating dimensions, they can be used in the logical test.

In some embodiments, if the logical test passes 405, the particle will be included in the media element 406 for that subscriber variation. If there are more particles 407, the cycle repeats itself. Once all of the tests have been completed, the media element can be edited together 408 from the component media particles and the result is made available to the media production device 409.

FIG. 5 shows one embodiment of a variation-aware content authoring device. In the embodiment illustrated in FIG. 5, the software is present on a web server and can be loaded by any author with a web browser and a connection to the Internet.

This example of FIG. 5 shows a media element script with four particles. Each particle has a serial number 501 and a logical condition associated with it 502. In some embodiments, particles can be unconditional meaning that all variations are to include that particle.

The media content authoring device in the embodiment of FIG. 5 also shows a textual representation 503 of a particle, which although shown as text in the script can be intended to direct the production of an audio or video media element. For example, in some embodiments where a television program is being created, the text in this box may be the script for the narrator to read and/or it may be a description of the visual elements included (e.g., "MEDIUM CLOSE UP of Mr. Smith walking by a Starbuck's kiosk and saying 'Hello' to his friend"). In the example of FIG. 5, the particle can also include a link to the media element file that the textual representation of the video refers to.

Some embodiments of variation-aware media content authoring devices may also have the capability to filter the presentation 504 such that it can be viewed from various subscriber variation perspectives. For example, one can set the preview filters to mock any subscriber variation record and see what particles will be included in that subscriber variation.

Unless explicitly stated, the method embodiments described herein are not constrained to a particular order or sequence. Additionally, some of the described method embodiments or elements thereof can occur or be performed at the same point in time.

The embodiments described herein can be performed by software and/or firmware (e.g., computer executable instructions), hardware, application modules, and the like, executable and/or resident on the systems and devices shown or described herein or otherwise. The embodiments of the invention are not limited to any particular operating environment or to instructions written in a particular programming language. Software, firmware, and/or processing modules, suitable for carrying out embodiments of the present invention, can be resident in one or more devices or locations. Processing modules can include separate modules connected together or include several modules on an application specific integrated circuit (ASIC).

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

I claim:

1. A media production device, comprising:
a processor; and
a memory having instructions executable on the processor, including instructions to:
define a number of variating audience dimensions for producer-controlled media elements for a media presentation using input from a producer of the media presentation to be presented to a number of individual subscribers;
maintain a number of subscriber variation database tables for each of the number of individual subscribers, wherein the subscriber variation database tables each have a number of records that when queried defines a number of subscriber variations in terms of a first set of variating dimensions of characteristics associated with each individual subscriber from the number of variating dimensions;
maintain a number of media element database tables having a number of records that when queried defines a number of media elements to be presented to the number of individual subscribers in terms of a second set of variating dimensions from the number of variating dimensions of characteristics associated with the number of individual subscribers; and
define a variation of an instance of the media presentation for at least one of the number of subscriber variations by comparing the first set of variating dimensions for a subscriber variation with the second set of variating dimensions for at least one of the number of producer-controlled media elements in order to determine which producer-controlled elements and in what order the producer-controlled elements are to be included in the variation of the instance of the media presentation to be presented to a particular individual subscriber.

2. The device of claim 1 wherein the device includes one subscriber variation database table and a plurality of media element database tables.

3. The device of claim 1 wherein the device includes one media element database table and a plurality of subscriber variation database tables.

4. The device of claim 1 wherein the first set of variating dimensions is a subset of the number of variating dimensions.

5. The device of claim 1 wherein the second set of variating dimensions is a subset of the number of variating dimensions.

6. The device of claim 1 wherein a record in at least one of the number of subscriber variation database tables represents a group of multiple end users.

7. The device of claim 1 wherein a record in the media elements table represents a group of multiple media elements.

8. The device of claim 1 wherein a number of feedback tables are added to the database comprising data about subscriber behavior in consuming previous instances and wherein the feedback tables are used in the determination of which elements and in what order the elements will be included in the variation of the instance of the presentation.

9. The device of claim 1 wherein a number of third party tables are added to the database having data about subscribers and wherein the third party tables are used in the determination of which elements and in what order the elements will be included in the variation of the instance of the presentation.

10. The device of claim 1 wherein the media elements are edited together into a number of media files by the media production device to create the variation of the instance of the media presentation.

11. The device of claim 1 wherein a variation definition file, that provides an ordered list of media elements to be included in a variation of an instance of a media presentation, is created by the media production device.

12. The device of claim 11 where the media elements listed in the variation definition file are edited together into a number of media files by the media production device when the variation is requested by the subscriber to create the variation of the instance of the media presentation.

13. The device of claim 11 wherein a variation definition file is stored in memory as executable instructions until the variation is requested by a subscriber affiliated with the subscriber variation at which time a number of media element files that make up the variation of the instance of the presentation is sent to the media presentation device.

14. The device of claim 13 wherein the variation definition file is sent along with a number of media element files to allow the media element files to be presented in succession giving the appearance of a lesser number of distinct media element files.

15. The device of claim 1 wherein a variation navigation file, which is a virtual table of contents indicating a temporal location of each individual media element within a variation of an instance of a media presentation is created such that subscribers can navigate to individual elements within the variation of the instance of the media presentation.

16. The device of claim 15 wherein a number of permissions are included in the variation navigation file for each individual media element that dictates how and in what manner the end user can have the media elements presented.

17. The device of claim 15 wherein a variation navigation file includes instructions on how to display parallel media content on a presentation device.

18. The device of claim 1 wherein at least one of the media elements are made up of a number of media particles that were created according to and are identified in a variation-aware media element script whereby the media particles included in the element were determined by performing a number of logical tests for each media particle wherein the variable inputs of the logical test are the first set of variating dimensions from the subscriber variation.

19. The device of claim 1 wherein a variation-aware media element content authoring device is used to create the media used by the media production device.

20. A system for a producer of media content to provide multiple variations of media content comprising:
a media production component stored on a computer-readable medium and having computer-executable instructions executable by a processor to:
define a variation of an instance of a media presentation based on at least one subscriber variation by comparing a first set of variating audience dimensions with a second set of variating dimensions associated with a number of media elements in a database for at least one producer-controlled media element to determine which producer-controlled elements and in what order the producer-controlled elements are to be included in a variation of an instance of the media presentation to be presented to a particular individual subscriber;
a distribution server component;
telecommunications network component; and
a presentation component.

21. The system of claim 20 wherein the distribution server component and the media production component are provided in a single system device.

22. The system of claim 20 wherein the media production component creates a number of XML feeds for each variation of the instance of the media presentation placed on the distribution server component.

23. The system of claim 20 wherein the system tracks the instances of the media presentation which have been placed on the presentation component and wherein subsequent executable instructions sent to the presentation component cause the deletion of a number of media files representing an instance of a media presentation stored on the presentation component.

24. A media content authoring device, comprising;
a processor; and
a memory having instructions executable on the processor, including instructions to:
receive from an author of media content a number of variating audience dimensions comprising a number of logical conditions which are associated with author-controlled media elements of a media presentation such that an output produced when the media presentation is automatically processed through a variation-aware presentation engine varies for a subset of an audience based upon that audience subset's saved profile of common variating audience dimensions.

25. The device of claim 24 wherein the presentation engine is a media production device.

26. The device in claim 24 wherein the presentation engine is a web server.

27. A method comprising:
utilizing a processor and a memory having instructions executable on the processor for:
defining by a producer of media content a variation of an instance of a media presentation based on at least one subscriber variation by comparing a first set of variating audience dimensions with a second set of variating dimensions associated with a number of media elements in a database for at least one producer-controlled media element to determine which producer-controlled elements and in what order the producer-controlled elements are to be included in a variation of an instance of the media presentation to be presented to a particular individual subscriber;
creating a hardware identifier for an end user presentation device;
sending the hardware identifier to a media production device to create an encryption key; and
encrypting a number of media files each having a media payload by associating the encryption key to the media file such that only the media payload is encrypted and such that the encrypted file can only be presented on the end user presentation device for which the file was encrypted.

* * * * *